UNITED STATES PATENT OFFICE.

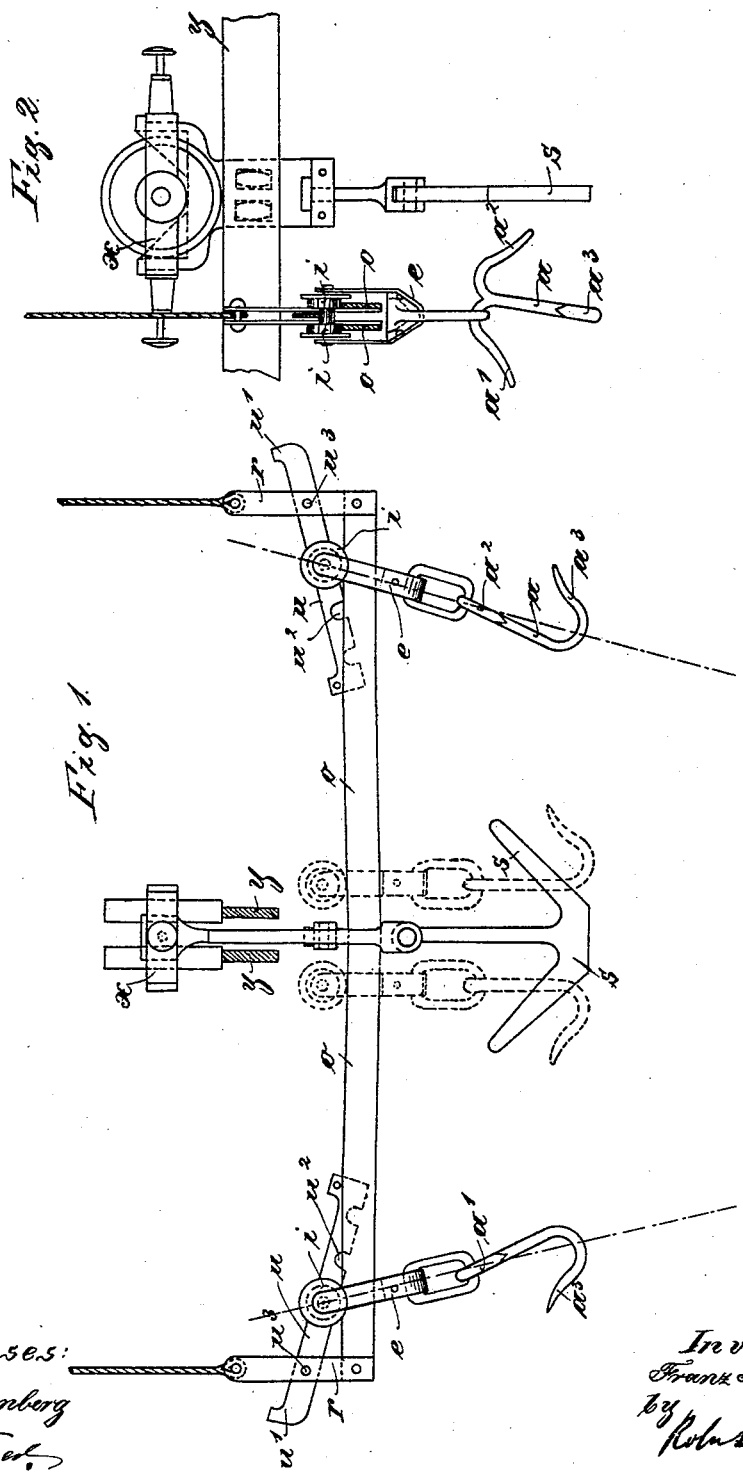

FRANZ SCHNELL, OF CASSEL, GERMANY.

GAMBREL.

SPECIFICATION forming part of Letters Patent No. 630,935, dated August 15, 1899.

Application filed December 30, 1897. Serial No. 664,710. (No model.)

*To all whom it may concern:*

Be it known that I, FRANZ SCHNELL, a subject of the King of Prussia, German Emperor, and a resident of Cassel, in the Province of Hesse-Nassau, German Empire, have invented certain new and useful Improvements in Gambrels, (for which patents have been obtained in Austria, No. 2,080, Vol. XLVII, dated June 2, 1897, and in Great Britain, No. 14,972, provisional application filed June 21, 1897,) of which the following is an exact specification.

This invention refers to gambrels as used for spreading the legs of a carcass; and my improvements in such gambrels relate to certain arrangements and combinations of parts, as are fully described hereinafter.

The main feature of my improved gambrel resides in the hooks being provided with rolls that are arranged to move along upon the gambrel-arms, so that the hooks, together with the load hung thereon, may easily be moved from the inner ends or adjacent parts of the arms of the gambrel to the outer parts of the same. In this position (in which the legs of the carcass are spread) the rolls may be secured in place by any suitable means, preferably by lever-arms that are hinged to the ends of the gambrel.

In order to make my invention more clear, I refer to the accompanying drawings, in which similar letters denote similar parts throughout the different views, and in which—

Figure 1 is an elevation of my improved gambrel in connection with a traveling carrier, and Fig. 2 a side view of the same.

In the form of construction shown as an example in the drawings the hooks $a$ are the known triple hooks—i. e., they are each furnished with three spikes $a'$ $a^2$ $a^3$, the spike $a^3$ being located at the lower end and the spikes $a'$ $a^2$ at the upper end of the hooks $a$. The latter are attached to bow-like links $e$, which hang down from the axles of the rolls $i$.

The gambrel proper consists of two parallel bars or rails $o$, each of which forms a very obtuse angle. In other words, the two halves of each rail ascend very slightly from the middle of the rail to the ends of the same, so that the rolls $i$ when located at or near to these ends may roll down upon said halves until they meet each other. To hold the hooks $a$ and the rolls $i$ in the position in which the legs of the carcass are spread, I make use of the movable arms $u$, which are fulcrumed at $u^3$ to pairs of upwardly-extending bars $r$, secured to the ends of the rails $o$. Each of the arms $u$ is provided with recesses $u^2$, that are adapted to take over the reduced middle portion of the rollers $i$, so as thereby to keep these rollers in position. (See Fig. 1.) The dotted lines extending downward from the spikes $a^3$ and converging toward each other indicate the legs of the carcass when spread. To release the hooks $a$ or, more precisely, the rolls $i$ after the carcass has been cut into two equal parts or halves, the levers $u$ are turned by means of their outwardly-projecting arms $u'$, when the rolls $i$, together with the hooks $a$ and the load of the same, will instantly move toward each other until they have arrived in the position shown in dotted lines.

To remove both halves of the carcass from the hooks $a$ at one time, I let said hooks cooperate with a double hook $s$, which hangs down from a two-wheeled car $x$, arranged to be moved along upon horizontal rails $y$. The latter extend at right angles to the gambrel, and this latter is located below said rails and may be raised from its normal low position up to the said rails $y$, so that then the spikes $a^3$ of the hooks $a$ are in about the same height as the double hook $s$.

After the carcass has been divided in two parts, as before mentioned, and after the rolls $i$ have been relieved from the checking action of the levers $u$ the gambrel is raised up to the position shown in Fig. 1, and the car $x$ is moved in the direction to the gambrel until the double hook $s$ has arrived below the spikes $a^2$ of the hooks $a$. Thereafter the gambrel is lowered so that the spikes $a^2$ take into or get coupled with the double hook $s$, when the carcass is supported not any more by the two hooks $a$, but by the double hook $s$. The gambrel is thus freed from the carcass, and the latter may be removed to the ice-safe, cooling-chamber, or other place by means of the car $x$.

Having thus fully described the nature of this invention, what I desire to secure by Letters Patent of the United States is—

1. In an improved apparatus for suspending and transferring carcasses, hooks $a$ provided with roller $i$ adapted to move upon a main rail *o* inclined to the center, in combination with a device for holding the hooks in working position, and a car *x* with double hook *s* situated at the middle of the rail for taking up the two halves of the carcass, when after releasing the device for holding the hooks the hooks *a* approach to the center, substantially as set forth.

2. In an improved apparatus for suspending and transferring carcasses, the combination of an inclined rail *o* formed with upward projection *r* at its extremity, the hooks with their supporting-roller and the arresting device pivoted to the upward projection and engaging the roller and hook for the purpose of retaining said roller and hooks in position to receive the carcass, substantially as described.

In testimony whereof I have signed this specification in the presence of two subscribing witnesses.

FRANZ SCHNELL.

Witnesses:
LEVI HEINEMANN,
LEO. MASUREK.